(12) United States Patent
Reeves-Collins et al.

(10) Patent No.: US 9,536,255 B2
(45) Date of Patent: Jan. 3, 2017

(54) VARIETY COOKIE DOUGH ORDERING AND DELIVERY SYSTEM

(75) Inventors: Donna Reeves-Collins, Pittsford, NY (US); William O. Collins, Pittsford, NY (US)

(73) Assignee: Cole & Parks LLC, Fishers, NY (US)

(*) Notice: Subject to any disclaimer, the term of this patent is extended or adjusted under 35 U.S.C. 154(b) by 2786 days.

(21) Appl. No.: 10/980,352

(22) Filed: Nov. 3, 2004

(65) Prior Publication Data

US 2005/0097009 A1 May 5, 2005

Related U.S. Application Data

(60) Provisional application No. 60/517,252, filed on Nov. 4, 2003.

(51) Int. Cl.
*B65D 85/36* (2006.01)
*G06Q 30/06* (2012.01)
*B65D 79/00* (2006.01)

(52) U.S. Cl.
CPC ............. *G06Q 30/06* (2013.01); *B65D 79/00* (2013.01); *G06Q 30/0601* (2013.01); *B65D 85/36* (2013.01)

(58) Field of Classification Search
CPC ...... G06Q 30/06; G06Q 30/0301; B65D 79/00
USPC ............... 206/459.1, 521.1, 521.6, 583, 586, 521.8,206/778, 782, 459.5; 220/377, 840, 500–519; D9/757; 426/112, 115, 119, 120, 87
See application file for complete search history.

(56) References Cited

U.S. PATENT DOCUMENTS

| | | | | |
|---|---|---|---|---|
| 1,861,124 A * | 5/1932 | Lorber | ............................. | 426/119 |
| 2,007,261 A * | 7/1935 | Stover | .......................... | 206/459.5 |
| 2,601,700 A * | 7/1952 | Pinsky et al. | ................... | 425/105 |
| 3,258,187 A * | 6/1966 | Greatman | .................... | 206/521.1 |
| 3,568,914 A | 3/1971 | Ahlmeyer | | |
| 3,730,420 A * | 5/1973 | Burkett | ........................ | 206/521.1 |
| 3,865,299 A | 2/1975 | Crabtree | | |
| 4,286,940 A * | 9/1981 | Gendron | ......................... | 425/533 |
| 4,733,863 A * | 3/1988 | Novotny | ......................... | 273/429 |
| 4,911,939 A | 3/1990 | Lou et al. | | |
| 5,282,534 A * | 2/1994 | Lapp | .............................. | 206/232 |
| 5,366,744 A * | 11/1994 | Drummond et al. | ........... | 426/128 |
| 5,731,020 A * | 3/1998 | Russo | ............................. | 426/104 |
| 5,888,565 A * | 3/1999 | Gics | ................................ | 426/124 |
| 5,925,390 A * | 7/1999 | Kornacki | .......................... | 426/87 |
| 6,041,932 A * | 3/2000 | Holmberg | ....................... | 206/534 |
| 6,231,906 B1 * | 5/2001 | Alessi | ............................. | 426/119 |

(Continued)

*Primary Examiner* — Anthony Stashick
*Assistant Examiner* — Ernesto Grano
(74) *Attorney, Agent, or Firm* — Duane C. Basch; Basch & Nickerson LLP

(57) ABSTRACT

The present invention is a method and apparatus the delivery of ready-to-cook foodstuffs, such as cookie dough eggs, in response to a consumer's order or selection. The system contemplates obtaining a consumer's order for ready-to-cook dough eggs, and storing consumer's order data in a memory of a point-of-sale computer system. The ordering data is then displayed on a point-of-sale system for fulfillment by a service associate, who assembles and packages the consumer's order in a carton in accordance with the order displayed. In the particular dough egg embodiment, the "eggs" are placed in numbered recesses in a clam-shell carton and an order fulfillment sheet is printed an attached. The order fulfillment sheet includes a listing of the variety of dough egg that has been placed in each of the numbered recesses in the container.

1 Claim, 6 Drawing Sheets

(56) References Cited

U.S. PATENT DOCUMENTS

| | | | |
|---|---|---|---|
| 6,237,843 B1* | 5/2001 | Falat et al. | 229/125.35 |
| 6,325,691 B1* | 12/2001 | Witte, Jr. | 446/69 |
| 6,349,820 B1* | 2/2002 | Kelley et al. | 206/223 |
| 6,561,235 B2 | 5/2003 | Finkowski et al. | |
| 6,627,239 B1* | 9/2003 | Gavie et al. | 426/128 |
| 6,733,803 B1* | 5/2004 | Vidkjaer | 426/62 |
| 2002/0142081 A1* | 10/2002 | Ream et al. | 426/396 |
| 2004/0154475 A1* | 8/2004 | Shaw et al. | 99/426 |
| 2004/0198138 A1* | 10/2004 | Vasic et al. | 446/71 |

\* cited by examiner

VARIETY COOKIE DOUGH ORDERING AND DELIVERY SYSTEM

This application claims priority from U.S. Provisional Application No. 60/517,252, filed Nov. 4, 2003 by D. Reeves et al., the contents of which is hereby incorporated by reference in its entirety.

This invention relates generally to a system and method for the delivery of ready-to-cook foodstuff, and more particularly to a method and associated apparatus and packaging to facilitate the fulfillment of customer orders for variety cookie dough.

BACKGROUND AND SUMMARY OF THE INVENTION

The present invention is directed to a system and method, including a particular container, for the delivery of ready-to-cook cookie dough "eggs" in association with a cookie dough retailing operation. The operation is based upon a repeatable, franchiseable methodology for the ordering and fulfillment of consumer's orders as will be described in greater detail herein.

Heretofore, a number of patents and publications have disclosed containers for agricultural products such as eggs, and apparatus for the dispensing of cookie dough in preparation for cooking, the relevant portions of which may be briefly summarized as follows:

U.S. Pat. No. 6,561,235 to Finkowski et al., issued May 13, 2003, discloses an apparatus and method for depositing cookie dough into a tray, where the dough is extruded onto a tray moved by a conveyor or similar transport. In addition to the extruder, a cutoff blade is employed.

U.S. Pat. No. 4,911,939 to Lou et al., issued Mar. 27, 1990, teaches a shelf-stable microwavable cookie dough, where the dough is formed into individual cookie pieces and is pre-baked for a short period of time to provide a gluten skin on the cookie surface to provide an extended shelf life.

U.S. Pat. No. 3,865,299 to Crabtree, issued Feb. 11, 1975, discloses an egg carton with a flexible window well, where the carton is molded of a flexible material and has a bottom with two generally parallel rows of egg pockets therein.

U.S. Pat. No. 3,568,914 to Ahylmeyer, issued Mar. 9, 1971, teaches an egg carton having a molded paper pulp lower portion and a transparent plastic upper portion hingedly attached to the lower portion.

Consumers enjoy an opportunity to sample store-made specialty food items and, as expected, they will purchase specialty cookies in a ready-to-bake form. However, should a consumer wish to select a variety of ready-to-bake dough in single-serving size "eggs," a method of distinguishing the different varieties from one another is required. In the retail operation in which the present invention finds particular use, a consumer is encouraged to purchase ready-to-cook foodstuffs in the form of egg or ball-shaped servings of cookie dough. The "dough eggs" as they are called, are available in a plurality of known and retailer-specific flavors or recipes, including chocolate chip, peanut butter, molasses, oatmeal raisin, oatmeal butterscotch, snickerdoodle, etc. Dough Eggs, as used herein, represents pre-formed balls of cookie dough available to customers by the variety dozen in a custom tooled egg carton, where the customer can order whatever flavor cookies they want in a customized dozen. Accordingly, the present invention is directed to a system and method of facilitating the order and delivery of ready-to-bake dough eggs, including custom packaging for such delivery.

In accordance with the present invention, there is provided a system for the delivery of ready-to-cook foodstuffs in response to a consumer order, comprising: a point-of-sale order terminal (at site, manual/automatic, remote) for logging a consumer's order for foodstuffs in single-serving sizes; a memory for storing data entered at the point-of-sale order terminal and representing the consumer's order; a processor for analyzing the data stored in memory for a particular order and re-ordering the data to group at least like foodstuff selections together; a display for displaying the consumer's order on a point-of-sale system for fulfillment of the consumer's order by a service associate; a container for packaging the consumer's order in accordance with the order displayed on the point of sale system, wherein the foodstuffs are placed in numbered recesses in the container; an order fulfillment sheet for attachment to the container, wherein the fulfillment sheet is printed separate from a sales receipt and includes a listing of the type of foodstuff that has been placed in each of the numbered recesses in the container; and means for delivering the container and the fulfillment sheet to the consumer at or near the time of payment (e.g., drive-up window, counter, delivery vehicle, self-serve, etc.).

In accordance with another aspect of the present invention, there is provided a method for the delivery ready-to-cook foodstuffs in response to a consumer order, comprising the steps of: obtaining a consumer's order for foodstuffs in single-serving sizes; storing data representing the consumer's order in a memory; re-ordering the data to group like selections together; displaying the consumer's order on a point-of-sale system for fulfillment of the consumer's order by a service associate; packaging the consumer's order in accordance with the order displayed on the point of sale system, wherein the foodstuffs are placed in numbered recesses in a clam-shell container; printing an order fulfillment sheet for attachment to the container, wherein the fulfillment sheet includes a listing of the type of foodstuff that has been placed in each of the numbered recesses in the container; and completing the order fulfillment by closing the container and delivering the container and the fulfillment sheet to the consumer at the time of payment.

In accordance with yet another aspect of the present invention, there is provided a container for ready-to-cook foodstuffs, comprising: a lower portion having a plurality of recessed regions formed therein; an upper cover, covering said lower portion; a flexible hinge connecting the lower portion and the upper cover, wherein the hinge, the lower portion and the upper portion are made of the same material, and where the lower portion, the hinge and the cover form a clamshell design; and a symbol (identification means) associated with each of the plurality of recessed regions formed in the lower portion.

One aspect of the invention is based on the discovery of a new technique for selling and delivering cookie dough or similarly ready-to-cook foodstuffs. The techniques are related to the manner in which consumer's may order the foodstuff's in a variety package (much like the ordering of a doughnuts, ice cream confections, fast food, etc. where the consumer places a custom order for the items desired), and the ways in which the order is logged, fulfilled and delivered to the consumer. Also, the method of packaging ready-to-cook foodstuffs such as cookie dough, and the way in which such foodstuff may be identified form unique aspects of the present invention.

The techniques and aspects of the invention described herein are advantageous because they permit an efficient and inexpensive method of fulfilling a consumer's order for dough eggs or similar foodstuffs in a fashion that will be well received by the consumer. Moreover, the aspects of the invention are flexible enough so as to be adaptable to any of a number of foodstuffs. The techniques of the invention are advantageous because permit the fulfillment of a consumer order from a range of alternatives. As a result of the invention, the cost-effective delivery of variety cookie dough and similar foodstuffs will be possible.

Figure 1:
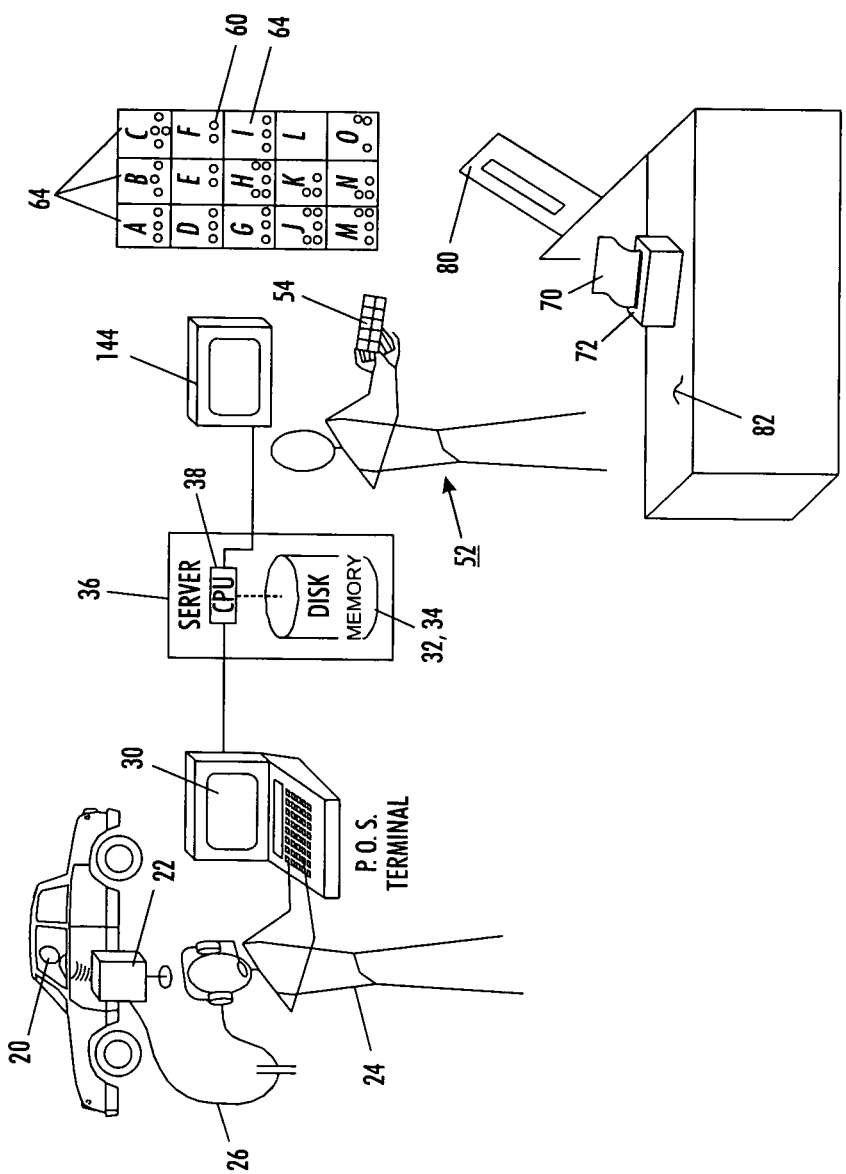
FIG. 1 is a general diagram of a system in accordance with an embodiment of the present invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements.

The present invention is directed to a system, method and packaging to enable the ordering and delivery of variety foodstuffs, particularly ready-to-cook cookie dough in a "dough egg" configuration. As used herein the term "dough egg" is intended to represent a single-serving size of ready-to-cook cookie dough or a similar foodstuff item (e.g., Cookies, Brownies, Candy, Mints, Bagels, Olives, Cheese, and Muffin and Scone Dough).

Referring to FIG. 1, depicted therein is a system intended to enable the delivery of dough-eggs or similar ready-to-cook foodstuffs. More specifically, the consumer 20 may arrive at a drive-up ordering kiosk 22, where a remote attendant 24 is in communication with the consumer via a communication system 26 such as a wired or wireless transceiver. In a well-known fashion, the user is prompted by the attendant and/or a menu system, to place an order. In this case, the order will be for the selection of one or more of a plurality of dough eggs (60). In response to a consumer's order, the attendant enters the order data into a point-of-sale order terminal 30. It will be appreciated that while depicted in a drive-up embodiment, the consumer ordering may also be accomplished via other on-site methods including walk-up, walk-in, etc., and via on-site or remote ordering systems for later pick-up or delivery (e.g., an Internet ordering menu). In any of the various ordering alternatives, the order data is entered and logged at the point-of-sale system 30 for the consumer's order of single-serving dough eggs. It will be further appreciated that the point-of-sale system may include one or more databases, with which the system interacts, in order to track sales, inventory and other statistics of interest in a retail sales environment.

Once received, the consumer's order is preferably stored in a memory 34 or similar data storage device associated with a computer system 36 having mass storage such as a disk 32 and a central processing unit 38 for handling the point-of-sale transactions (either on-site or remote). Once entered, the data is retained in memory (RAM, disk, etc.), at least temporarily, to record the consumer's order. After entry of a complete order, the CPU preferably operates to process the order data for fulfillment as will be described in more detail below.

The order is then displayed on the same or a similar point-of-sale system 30, or on another terminal or monitor 50, where a service associate 52 is able to review the order and manually fill the order by selecting the variety of dough egg ordered and placing it in a package or carton 54. Although described as a manual operation, it is further contemplated that such a system may be automated if sufficient volumes are achieved so that the orders may be placed and filled in an automated fashion. Such a system may facilitate the ordering and delivery of dough eggs through on-line menu/ordering systems, particularly for orders to be filled with frozen dough eggs for delivery via overnight carrier or the like.

As will be described below, the carton into which the dough eggs are placed while filling a consumer's order preferably includes a plurality of depressions or recesses to hold the dough eggs therein and prevent them from moving about in the carton. In fulfilling the order, associate 52 selects the dough eggs 60 from one of a plurality of bins 64 or containers holding similar varieties of dough eggs, such that the associate is able to select and insert the dough eggs into the container in an order that generally corresponds with the ordered arrangement of the dough eggs in the bins 64. In other words, the point-of-sale system is able to group and order the consumer's request into a listing, viewable by the sales associate, which will allow the associate to efficient select and place the dough eggs in the carton. It will be appreciated that the bins may be labeled or otherwise identified to clearly show the variety of dough eggs 60 contained within each bin. It will be further appreciated that the point-of-sale system may also keep track of the quantities of dough eggs originally in each bin and the number removed to fulfill orders in order to prompt the sales associate or others of the need to replenish the dough eggs inventory within a particular bin.

As will be described in more detail below, the carton 54 for packaging the dough eggs in the consumer's order includes numbered recesses to hold the dough eggs, and the sales associate 52 places the eggs in the numbered recesses in accordance with the information on the point-of-sale system or list for reasons that will now be described. As will be appreciated, cookie dough for different varieties of cookies may be difficult to distinguish. Thus if a consumer orders a molasses cookie dough egg and a peanut butter cookie dough egg, it may be difficult for a consumer to discriminate between the dough eggs when they are placed into the carton 54. Hence, one aspect of the present invention is directed to placing the dough eggs into the container in an order determined by common groupings performed by the point-of-sale system. Moreover, the dough eggs are placed into specific, numbered positions or recesses in the carton.

Subsequently, an order fulfillment sheet 70 is printed from point-of-sale printer 72 for attachment to the carton 54. It is contemplated that the order fulfillment sheet 70 is printed separate from a sales receipt and includes a listing of the type of foodstuff that has been placed in each of the numbered recesses in the carton or container. In one embodiment, the listing may be a separate item that is affixed, in some manner, to the carton. For example, the list, and possibly any associated baking directions, may be printed by a print-on-demand device on an adhesive-backed stock for affixing to the carton. Alternatively, the list and associated directions may be affixed to the carton using a decorative envelope and an elastic ribbon loop that is stretched overran end of the carton.

Subsequently, the completed carton and the fulfillment sheet are delivered to the consumer 20 by any suitable means for delivering the carton, including a pick-up window 80, a counter 82, etc. It will also be appreciated that a delivery driver, delivery service, overnight shipping service, self-service boxes (e.g., post office box) or other means for delivery may be employed in accordance with alternatives to the system described herein.

Figure 2:
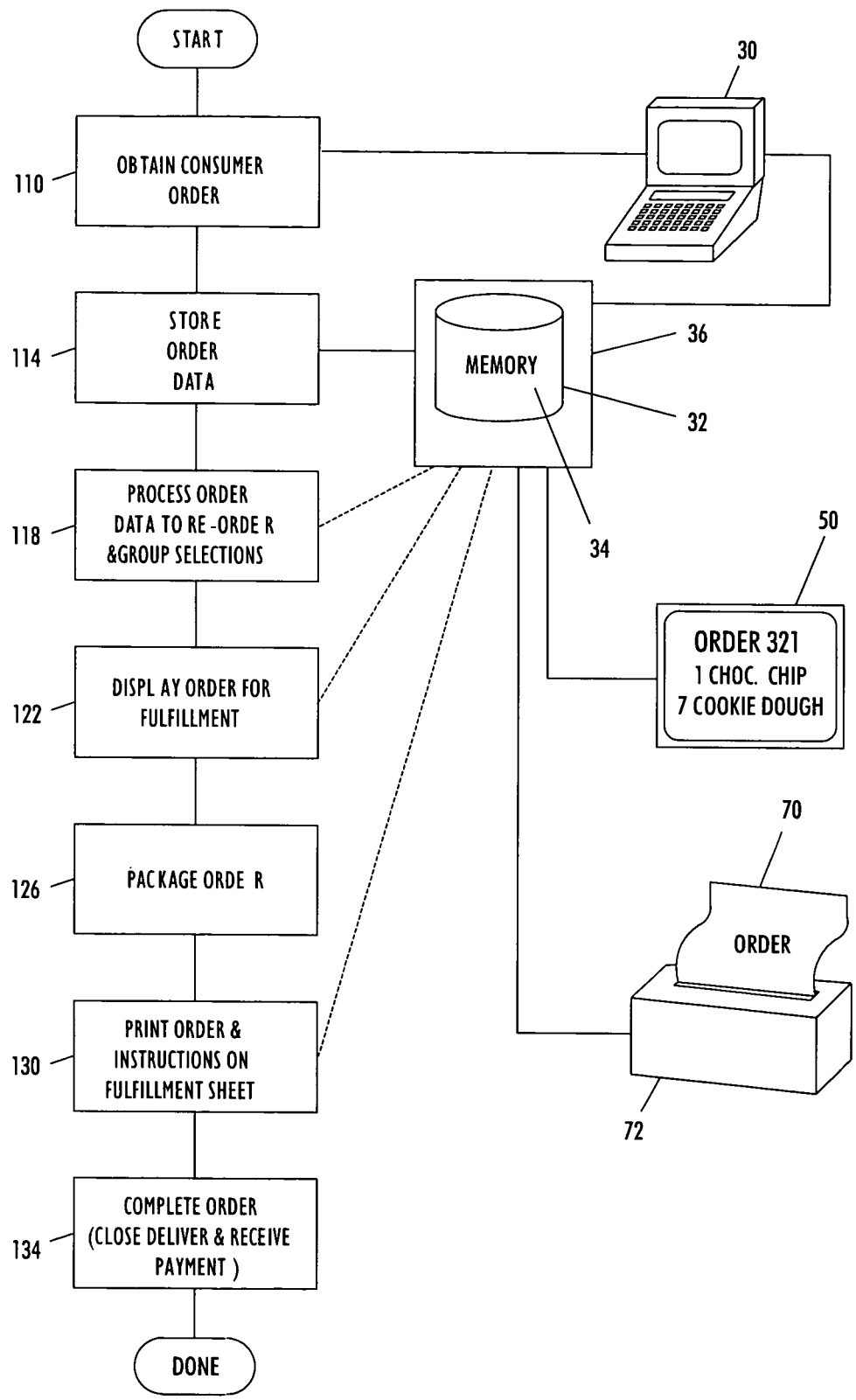
FIG. 2 is a flowchart illustrating the general steps performed in accordance with an aspect of the present invention.

Having generally described a system that may be employed to implement an embodiment of the present invention, attention is now turned to FIG. 2, where there is depicted a flowchart illustrating in detail the steps that are generally described above. Starting with step 110, a consumer's order is obtained. As noted previously, the order may be received via a drive-up or walk-in system as is well-known in the fast food industry, or may be received via alternative ordering methods and means. The consumer, in the present embodiment orders a plurality, and possibly multiple varieties, of foodstuffs such as dough eggs in single-serving sizes. Once the order is placed, or as it is being placed, the consumer order data is stored in memory 34 as depicted in step 114.

Subsequently, when the consumer has completed the ordering step, the point-of-sale system preferably groups and re-orders the consumer's selections as represented by step 118. More specifically, like cookie dough varieties ordered by the consumer are first grouped together. For example, as might be experienced when selecting a dozen doughnuts or bagels, it is common for consumers to initially ask for one or more of a certain variety and upon determining that they have more items left to select in a dozen, to add more of the previously selected variety. The point-of-sale system is programmed to group the varieties so that a total for each has been determined. Once grouped, the varieties are then preferably re-ordered in accordance with the arrangement of the order fulfillment layout. For example, as depicted in FIG. 1, item A is at the top left of set of dough egg bins, whereas item O is at the bottom right. To enable efficiencies in the fulfillment process, the consumer's order would be listed or displayed by the point-of-sale system in the "order" in which the varieties should be placed into the carton.

Once the consumer order data has been processed at step 118, it is then displayed at step 122 on a point-of-sale monitor 50, via order fulfillment slip or ticket 70 or via a similar means of communicating the quantity and variety, as well as the locations in the carton into which the dough eggs are to be placed. The service associate then makes the required selections and packages the order into carton 54 as represented by step 126. Again the order is preferably assembled in accordance with the order displayed on the point-of-sale system, wherein the dough eggs are placed in numbered recesses in a clam-shell carton. Step 130 represents the printing of an order fulfillment sheet for attachment to the carton, wherein the fulfillment sheet includes a listing of the variety of dough egg that has been placed in each of the numbered recesses in the carton. Finally, at step 134, the order is completed by closing the container and delivering the container, along with the fulfillment sheet, to the consumer at the time of payment.

Figure 3:
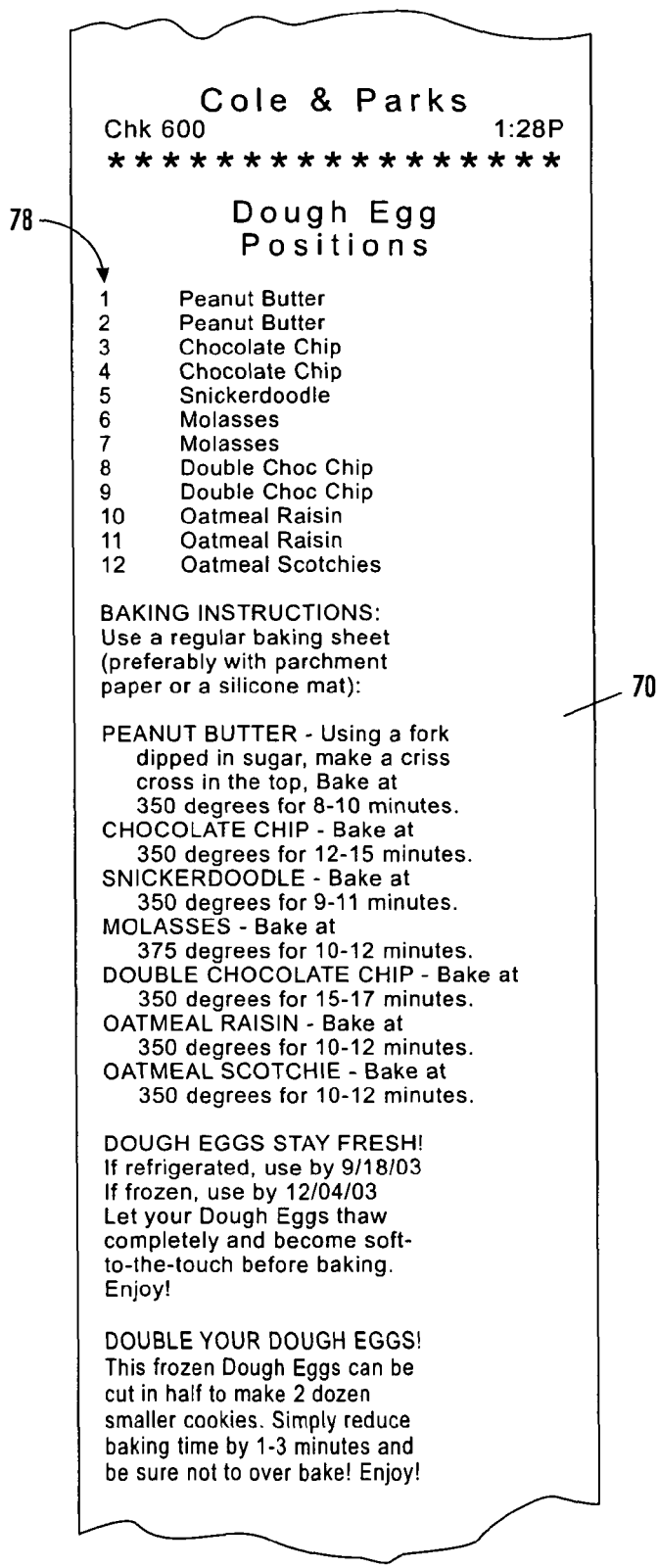
FIG. 3 is an illustrative example of an order fulfillment slip.
Figure 4:
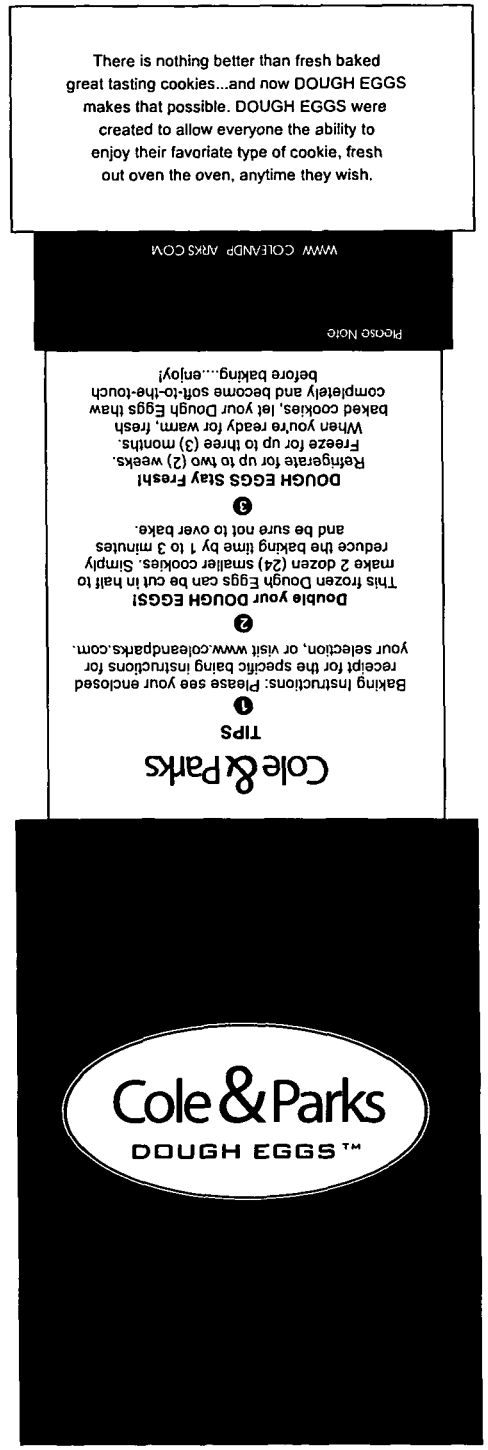
FIG. 4 is a holder for the slip of FIG. 3.
Figure 5:
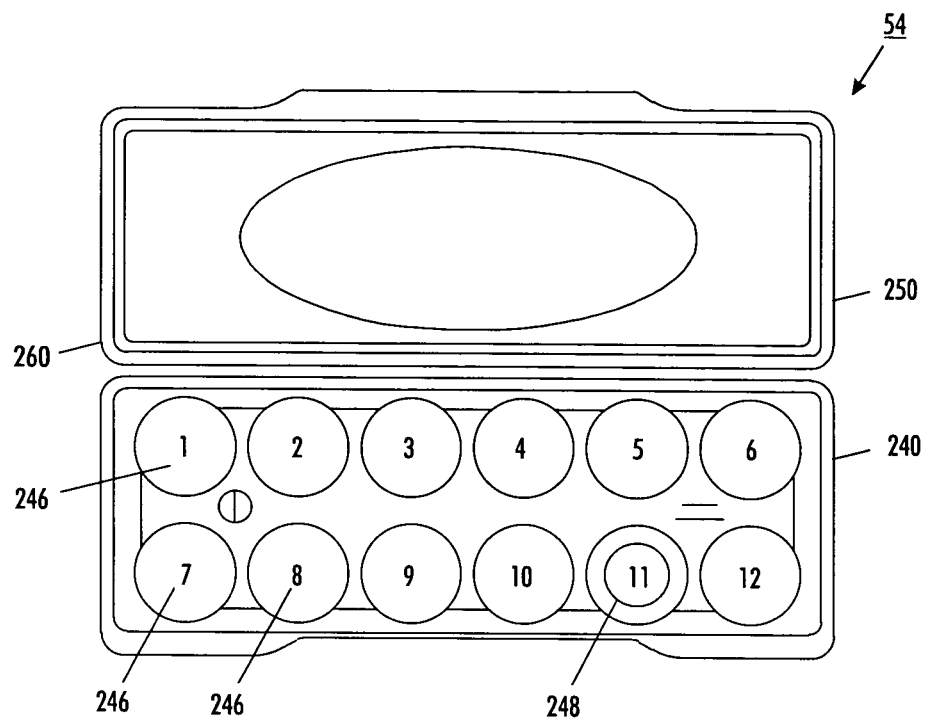
FIGS. 5-9 are orthographic views of a carton for dough eggs in accordance with an embodiment of the present invention.
Figure 6:
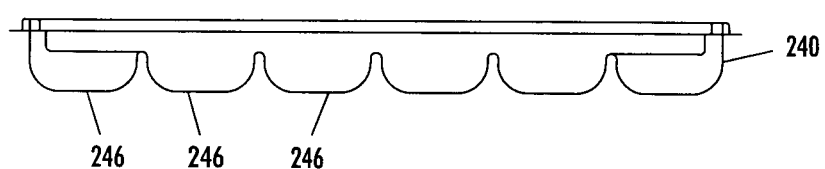
Figure 7:
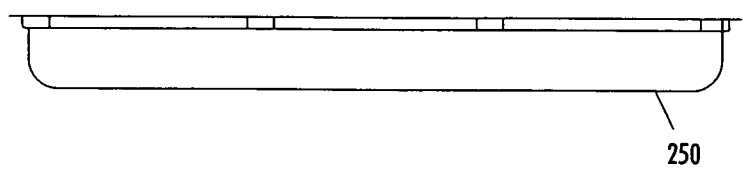
Figure 8:
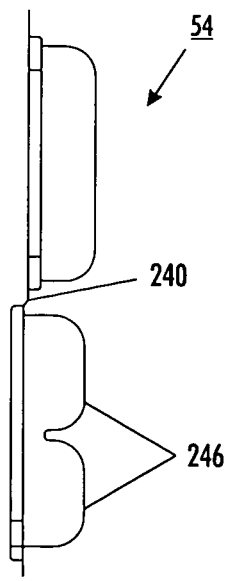
Figure 9:
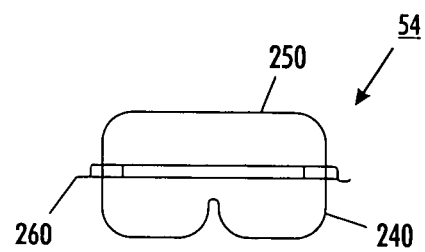

Referring also to FIG. 3, depicted therein is an exemplary order fulfillment sheet 70. As a further addition to the method described above, the point-of-sale system may be programmed to print, in addition to the variety and location of the dough eggs, a set of cooking and/or storage instructions for the dough eggs. In this way, the consumer will have a greater likelihood of a satisfactory experience with the purchase, cooking and consumption of the dough eggs. Further information that may be included on the order fulfillment sheet 70 includes, the date of purchase, data indicating a method for keeping the foodstuffs fresh, including data for refrigerated and frozen storage, additional tips or suggestions such as ideas for making dough eggs go further (e.g., cut in half and bake less time); and a "use by" date. It will be further appreciated that a small "holder" such as an open-ended envelope 210, as depicted in FIG. 4, may be used to attach the order fulfillment slip 70 to a carton. For example, it is contemplated that the holder 210 is preprinted and attached to the carton 54, perhaps using a ribbon, elastic string, self-adhesive strip, or by any of a variety of means for attaching the holder.

Turning now to FIGS. 5-9, depicted therein are various orthographic projection views representing the details of the container or carton 54. As illustrated, the carton includes a lower portion 240 having a plurality of recessed regions 246 formed therein. The carton also includes an upper cover 250, for covering the lower portion. It is believed preferable that a flexible hinge 260 connects the lower portion 240 and the upper cover 250, and that the hinge, the lower portion and the upper portion are made of the same material. As will be appreciated from a review of the figures, the lower portion, the hinge and the cover form a clamshell design. Also included in the lower portion are a series of symbols (e.g., alphanumerics) or other identification means 248 associated with each of the plurality of recessed regions formed in the lower portion. Such symbols are preferably embossed into the surface of the carton, such as by molding into the lower portion adjacent to or within the recesses, or may also be displayed on the underside of the cover when opened, in order to provide a consumer with a reference symbol corresponding to the identifier 78 on the order fulfillment slip 70.

As noted above, the carton 54 may have an attached label or slip that is customized to indicate the variety of dough egg 11 located in each of the recessed regions 246. Similarly, the slip, or an associated holder attached to the container may include instructions for completing the preparation of the dough eggs in accordance with the variety included in the carton (e.g., instructions only for those dough eggs ordered, not for all dough egg varieties).

As will be appreciated, the carton 54 is intended to provide for the delivery, transport and storage of different varieties of premium cookie dough eggs in ready-to-cook quantities for single cookies such that a consumer may simply remove a foodstuff from a recessed region and place it on a baking sheet to cook. The carton is preferably formed of a transparent plastic such as FDA-approved polyvinyl chloride (PVC), or similar materials exhibiting non-toxic, non-pyrogenic, and/or alkaline resistant, characteristics that render the materials suitable for food and beverage applications.

In an alternative embodiment, the present invention contemplates the ordering and delivery of dough eggs and similar single-serving quantities via web or Internet-based methods. Furthermore, the delivery of such items poses a problem of transporting the dough eggs via overnight or similar express carriers. To achieve such a system, the present invention contemplates the alteration of the dough egg carton, or an additional outer carton, whereby the dough eggs may be retained within an insulated outer container. In one embodiment of such a carton, the carton itself may incorporate the insulation, where walls or layers of the carton include insulating materials, but retain the afore-described compartments or depressions to hold the dough eggs and provide a symbol or mark for each such compartment. As an alternative, the carton 54, as depicted in detail in FIGS. 5-9 may be retained, but an outer container, possibly a final shipping container, would include a chamber or recess therein into which a completed carton may be placed and the shipping container sealed for shipment. In this alternative, the shipping container would include insulation therein so as to preserve the freshness of the dough eggs for as long as possible.

Although described herein as dough eggs, other foodstuffs are contemplated and within the scope of possibilities for delivery and storage within similar cartons. Foodstuffs contemplated include brownies, candy, mints, bagels, olives, and cheeses.

In recapitulation, the present invention is a system, method and container for the customized ordering and delivery of variety foodstuffs, particularly ready-to-cook cookie dough eggs.

It is, therefore, apparent that there has been provided, in accordance with the present invention, a method and apparatus for the fulfillment of custom orders for a variety of foodstuffs. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A carton for foodstuffs, comprising:
   a lower portion having a plurality of recessed regions formed therein, a
   plurality of the recessed regions holding only a single-serving size, ready-to-bake foodstuff consisting of a dough egg in a pre-formed ball of cookie dough;
   an upper cover, covering said lower portion;
   a flexible hinge connecting the lower portion and the upper cover, wherein the hinge, the lower portion and the upper cover are made of the same material, and where the lower portion, the hinge and the cover form a clamshell cover for the foodstuffs thereby enclosing the cookie dough eggs in the carton;
   an alphanumeric symbol associated with each of the plurality of recessed regions formed in the lower portion, each symbol uniquely identifying the associated recessed region; and
   a customized label affixed to the upper cover of the carton, the label including an indication of a type of cookie dough egg located in each of the recessed regions, wherein the type of ready-to-cook foodstuff is indicated in association with the alphanumeric symbol.

* * * * *